June 8, 1948.  C. E. SCHMITZ  2,443,151
ROTARY SEAL
Filed March 1, 1945
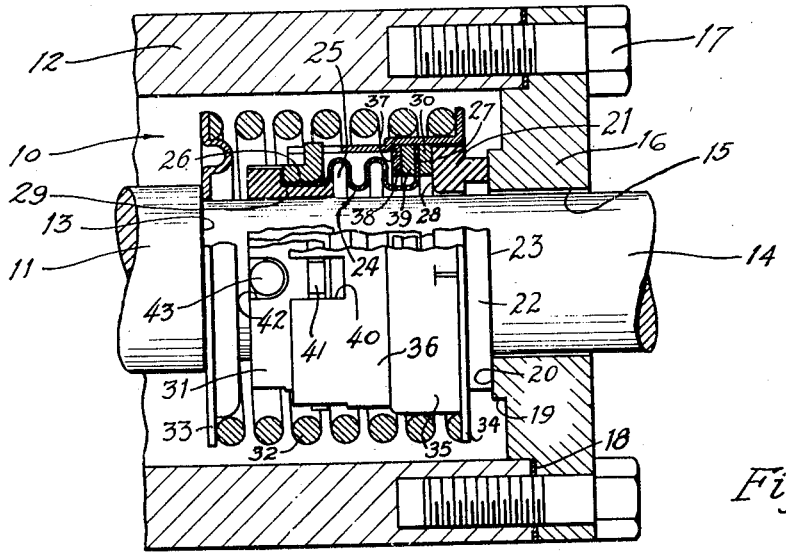
Fig. 1
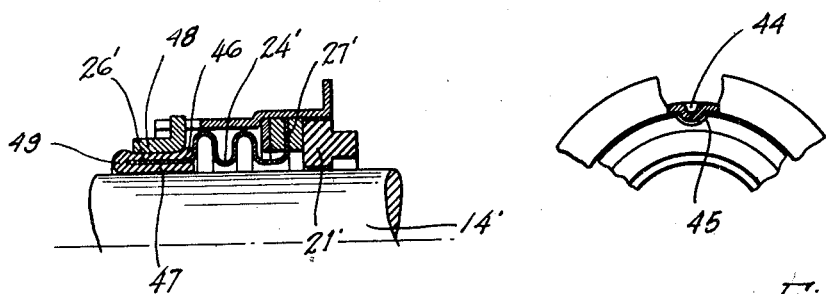
Fig. 2
Fig. 3
INVENTOR.
Carl E Schmitz
BY
Charles P. Vajtech
Atty.

Patented June 8, 1948

2,443,151

UNITED STATES PATENT OFFICE 2,443,151

ROTARY SEAL

Carl E. Schmitz, Chicago, Ill., assignor to Crane Packing Company, Chicago, Ill., a corporation of Illinois Application March 1, 1945, Serial No. 580,303

2 Claims. (Cl. 286—11)

This invention relates to rotary seals which utilize relatively rotatable radial surfaces to effect a seal, and particularly to such a seal which is adapted for operation in relatively higher temperature ranges.

There has been proposed a rotary seal which is comprised of a pair of relatively rotatable sealing elements, one of which is movable toward and away from the other, a support for the movable element and a resilient expansible sealing sleeve between the support and element. The sealing sleeve is made of synthetic rubber and has formed therein a fold which makes it possible for one end to move axially relative to the other end.

Under relatively low operating temperatures of approximately 175° F. to 200° F. the synthetic rubber will function satisfactorily, but above these temperatures, it will become increasingly hard and brittle as the temperature increases and will ultimately rupture and leak. Thus for high temperature work it has been customary to use a metal bellows for the sealing sleeve instead of the rubber bellows, the metal bellows being soldered to the sealing element and to the support to form a fluid-tight seal therebetween.

The soldering operation used in the manufacture of metal bellows is in general undesirable and costly. The dimensions of the sealing element and support must be held to close tolerances and the soldered joints must then be tested for leaks, which, in addition to the soldering operation itself, increases the amount of handling that the bellows must receive, which, of course, adds to the cost thereof.

The principal object of this invention is to provide a sealing means for a rotary seal which is capable of retaining its flexibility at relatively high temperatures, but which is readily assembled without the aid of a soldering or fusing operation.

A more specific object is to provide a sealing means for a rotary seal which utilizes a metal expansible element to provide the necessary flexibility for the seal and resilient compressible means to form a fluid-tight joint between the metal element and the sealing washer and its support.

These and other objects and features of the invention will become apparent from the following detailed description when taken together with the accompanying drawings in which Fig. 1 is a partial section through a rotary seal using a sealing element made in accordance with this invention;

Fig. 2 is a fragmentary section through a modification of the invention; and

Fig. 3 is a partial side view of the seal showing the means for driving the sealing washer.

Referring now to the drawings for a detailed description of the invention, the seal is shown applied to a chamber 10 which is defined in part by a shaft 11 and a housing 12. Said shaft 11 has a shoulder 13 which results from the formation of a reduced portion 14 on shaft 11. Said reduced portion 14 passes through an opening 15 in a closure plate 16 which is secured to housing 12 by means of bolts 17 or other fasteners. A gasket 18 compressed between closure plate 16 and housing 12 serves to provide a fluid-tight joint therebetween.

Closure plate 16 is formed with an annular rib 19 located within chamber 10 and having a ground and lapped sealing surface 20. Cooperating with annular rib 19 is a sealing washer 21 which is provided with a similar annular rib or nose 22, said rib having a sealing surface 23 suitably finished by grinding or lapping or otherwise, which abuts surface 20 to form a running fluid-tight seal therebetween. Said washer 21 has an internal diameter which is somewhat larger than the diameter of reduced portion 14 of shaft 11 so as to permit the washer to move freely in all directions to a limited extent with respect to the shaft. Thus, if the shaft is misaligned relative to the housing 12 or is subjected to axial and transverse vibrations, washer 21 may still be kept in fluid-tight contact with surface 20 because it is free to move relative to the shaft.

The washer 21 is sealed relative to shaft 11 by means of the apparatus now to be described. Said apparatus comprises a thin metal sleeve 24 having one or more folds 25 therein to permit the ends of the sleeve to move axially and radially relative to one another. The end 26 of sleeve 24 is made substantially cylindrical while end 27 is made in the form of a radially extending flange which is substantially transversely disposed with respect to the axis of rotation. It is contemplated that the flanged end 27 will be substantially parallel to the back surface 28 of washer 21. Instead of a soldered or fused connection between the ends of sleeve 24 and the washer and shaft, respectively, resilient compressible bands are used. It is contemplated that the bands will be compressed between the sleeve ends and the washer and shaft to such an extent that a fluid-tight joint will be formed, and once formed will be maintained regardless of the fact that the temperature within the chamber 10 may pass the point at which the bands lose their resiliency. Thus a cylindrical band 29 is inserted between end 26 and reduced portion 14 of shaft 11 and an annular band or washer 30 is inserted between flanged end 27 and sealing washer 21. The material from which these bands are made is chosen with particular regard to the fluid to be sealed and the temperatures at which the fluid is to operate. Thus if the fluid is a hydrocarbon, the bands may be made from a synthetic rubber of the type known commercially as "neoprene."

The means for compressing end 26 against band 29 and reduced shaft portion 14 comprises a rigid band 31 which may be made of metal such as brass or the like and which is made with an internal diameter of such size that a force-fit results when the rigid band, sleeve end 26 and resilient band 29 are assembled upon the shaft. The requisite pressure upon sealing washer 21 is supplied by a spring 32 which is compressed between a retaining washer 33 abutting shoulder 13 on shaft 11 and a flange 34 formed on a driving shell 35 which surrounds washer 21, sleeve end 27 and band 30. Said driving shell 35 has a portion 36 of reduced diameter, thus forming a shoulder 37 which transmits the spring pressure to a rigid washer 38 made of brass or the like and which in turn transmits the pressure to a second resilient band 39 adjacent flange 27 of sleeve 24. Thus the spring pressure tends to compress resilient band 30 between flanged end 27 and sealing washer 21 to effect a seal between the sleeve and washer. In order that the spring pressure may be evenly distributed over the thin and mechanically weak flange 27, the rigid washer 38 and resilient band 39 are used between flange end 27 and shoulder 37 on sleeve 36.

It is desirable to relieve the metal sleeve 24 of driving torque and for this reason driving shell 35 is formed with one or more slots 40 in each of which is received a lug 41 extending upwardly from and formed integrally with rigid band 31. Said band 31 is driven from the resilient band 39 principally by the friction created by the force-fit assisted by a similar driving arrangement comprising one or more slots 42 in band 31 in each of which is received a pin 43 molded or otherwise formed integrally with resilient band 29. At its opposite end, driving shell 35 is formed with one or more notches 44 (Fig. 3) which extend into suitable notches 45 formed in the periphery of sealing washer 21.

Referring now to Fig. 2 for a description of a modification of the sealing means of Fig. 1, there is shown a reduced shaft portion 14' corresponding to reduced portion 14 of Fig. 1, on which is mounted a sealing washer 21'. The washer is sealed relative to shaft 14' by a similar sleeve 24' having a radial flange 27' and cylindrical sleeve portion 26'. Instead of the direct contact between a rigid clamping band and the cylindrical sleeve end 26', there is utilized in the Fig. 2 modification a rigid band 48 which cooperates with a resilient compressible sleeve 49, the sleeve being slit to receive the end 26' in substantially the mid-portion of its radial cross-section. Thus the pressure of band 48 is exerted first upon the upper portion 46 of sleeve 49 and then through said portion 46 to the sleeve end 26' and the inner portion 47. This construction provides an envelope for the sleeve end 26', thereby avoiding metal to metal contact such as is present in the Fig. 1 design and which incorporates the use of the driving pin 43 in the resilient band 29 to prevent slippage between band 31 and sleeve end 26. In the Fig. 2 construction, band 48 acts upon sleeve end 26' through the intermediary of the resilient compressible upper portion 46, and since this portion is preferably made of a synthetic rubber material such as neoprene which possesses the property of "freezing" or vulcanizing to certain metals under the influence of prolonged pressure assisted by heat, no further driving means is required to transmit the drive from shaft 14' to band 48.

It will be noted that the flanged end 27' is sealed relative to washer 21' in the same manner as the flanged end 27 of Fig. 1 is sealed relative to its washer 21.

The resilient band 49 may be formed in any one of a number of ways. It may be formed with a contour substantially as shown in Fig. 2 and then slit by means of a cutting tool or it may be formed initially with a V section by ordinary molding techniques and the V simply closed when the band 48 is slipped over the exterior thereof.

It is apparent that the metal sleeve 24 will take all of the expansion and contraction and other movements necessary to maintain a tight seal between washer 21 and rib 19 of closure member 16, and that resilient compressible bands 29 and 30 in Fig. 1 and the corresponding band 49 in Fig. 2 will not be required to flex at any time. These compressible resilient bands merely take compressive forces and they are capable of taking such forces long after they have lost their ability to flex. At the temperatures at which the seal is assembled upon shaft 11, the bands of course possess full resiliency and the pressures of the rigid band 31 and spring 32 being applied while the bands are resilient causes the cooperating surfaces of the bands and sleeve ends to come in intimate contact with one another such that all irregularities and crevasses in the metal sleeve ends are thoroughly filled by the resilient compressible bands. The subsequent raising of the temperature of the bands does not disturb this intimate relation between the bands and sleeve ends. As long as the spring pressure and the pressure supplied by the rigid band 31 are present, the seal is complete and effective whether or not the texture of the resilient band becomes hard and brittle.

It is apparent that in assembling the seal upon the shaft, no soldering or fusing operation is necessary. The various elements of the seal are formed either in a molding operation, which is quite rapid and accurate, or in a die-formed operation which is likewise quite rapid and accurate. The various complete elements are readily assembled in their proper relation to one another by any mechanic and can in fact be partially assembled, at least insofar as the resilient bands and the sleeve ends are concerned, at the factory.

It is understood that the foregoing description is merely illustrative of preferred embodiments of the invention and that the scope of the invention therefore is not to be limited thereto, but is to be determined by the appended claims.

What is claimed is:

1. In a rotary seal, a sealing means for effecting a seal between an axially movable sealing washer and a substantially axially fixed support therefor, said means comprising a tubular sleeve capable of withstanding repeated flexure at relatively high temperatures, means for connecting one end of the sleeve to the washer and means for connecting the other end to the support, said last-mentioned means comprising a resilient compressible envelope for the sleeve end, and a rigid band encircling the envelope and compressing said envelope and sleeve end against the support to form a fluid-tight seal between the sleeve end and support.

2. In a rotary seal, a sealing means for effecting a seal between an axially movable sealing washer and a substantially axially fixed support therefor, said means comprising a metal sleeve having a bellows formed in one part thereof, a radially extending flange at one end of the sleeve, a resilient compressible washer interposed between the flange and sealing washer, a rigid washer concentrically arranged with respect to the flange, a second resilient compressible washer disposed between the rigid washer and flange opposite the first-mentioned resilient washer, a spring acting upon the rigid washer in a direction to compress the flange between the resilient washers and the resilient washers and flange against the sealing washer to effect a fluid-tight seal therebetween, a cylindrical region at the other end of the sleeve, a resilient compressible envelope for the sleeve end, and a rigid band encircling the envelope and compressing the envelope and sleeve end against the support to form a fluid-tight seal between the said sleeve end and support.

CARL E. SCHMITZ.

REFERENCES CITED

The following references are of record in the file of this patent:

UNITED STATES PATENTS

| Number | Name | Date |
| --- | --- | --- |
| Re. 22,666 | Snyder | Aug. 14, 1945 |
| 2,163,127 | Limpert | June 20, 1939 |
| 2,249,930 | Bailey et al. | July 22, 1941 |
| 2,291,954 | Dupree | Aug. 4, 1942 |
| 2,373,463 | Curtis | Apr. 10, 1945 |